United States Patent
Scholz

(10) Patent No.: US 8,920,274 B2
(45) Date of Patent: Dec. 30, 2014

(54) HYBRID DRIVE CONFIGURATION FOR A MOTOR VEHICLE

(71) Applicant: Norbert Scholz, Braunschweig (DE)

(72) Inventor: Norbert Scholz, Braunschweig (DE)

(73) Assignee: Volkswagon Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/772,239

(22) Filed: Feb. 20, 2013

(65) Prior Publication Data
US 2013/0165286 A1   Jun. 27, 2013

Related U.S. Application Data

(63) Continuation of application No. PCT/EP2011/004127, filed on Aug. 17, 2011.

(30) Foreign Application Priority Data

Aug. 24, 2010 (DE) .......................... 10 2010 035 205

(51) Int. Cl.
| | |
|---|---|
| *F16H 3/72* | (2006.01) |
| *F16H 37/06* | (2006.01) |
| *B60K 6/445* | (2007.10) |
| *B60K 6/48* | (2007.10) |
| *F16H 37/08* | (2006.01) |
| *F16H 37/10* | (2006.01) |

(52) U.S. Cl.
CPC .............. *F16H 37/065* (2013.01); *B60K 6/445* (2013.01); *B60K 6/48* (2013.01); *F16H 2037/0866* (2013.01); *F16H 2037/102* (2013.01); *F16H 2037/103* (2013.01); *F16H 2200/2023* (2013.01); *Y02T 10/6221* (2013.01); *Y02T 10/6239* (2013.01)
USPC ............................... 475/5; 475/277; 475/282

(58) Field of Classification Search
USPC .................................. 475/277, 282, 288, 900
See application file for complete search history.

(56) References Cited

U.S. PATENT DOCUMENTS 7,367,911 B2 *   5/2008   Raghavan et al. .......... 180/65.25
7,452,296 B2 *  11/2008   Bucknor et al. .................. 475/5
(Continued)

FOREIGN PATENT DOCUMENTS

| DE | 102004042007 A1 | 3/2006 |
| DE | 102005014332 A1 | 9/2006 |
| JP | 2005112019 A | 4/2005 |

OTHER PUBLICATIONS

Search Report issued by the German Patent and Trademark Office for German Patent Application No. DE 10 2010 035 205.5, dated Jul. 14, 2011.

(Continued)

*Primary Examiner* — Troy Chambers
*Assistant Examiner* — Ryan Dodd
(74) *Attorney, Agent, or Firm* — Manfred Beck, P.A.

(57) ABSTRACT

A hybrid drive configuration is provided wherein the carrier of a first planetary gear set is coupled with the ring gear of a second planetary gear set, which is embodied as a Ravigneaux gear set. The ring gear of the second planetary gear set is fixedly connected to a driven shaft. The carrier of the second planetary gear set is connectable to the ring gear of the first planetary gear set by a clutch. The ring gear of the first planetary gear set is fixedly connected to a drive shaft. The rotor of a first electric machine is fixedly connected to the sun gear of the first planetary gear set. The rotor of a second electric machine is fixedly connected to the first sun gear of the second planetary gear set. The second sun gear of the second planetary gear set is connectable to a housing by a brake.

6 Claims, 1 Drawing Sheet

(56) References Cited

U.S. PATENT DOCUMENTS

| | | | |
|---|---|---|---|
| 2004/0058769 A1 | 3/2004 | Larkin | |
| 2005/0169765 A1 | 8/2005 | Ito et al. | |
| 2007/0129202 A1 | 6/2007 | Raghavan et al. | |
| 2007/0270262 A1 | 11/2007 | Raghavan et al. | |
| 2008/0009380 A1 | 1/2008 | Iwanaka et al. | |
| 2008/0121447 A1* | 5/2008 | Lang et al. | 180/65.2 |
| 2008/0171625 A1 | 7/2008 | Goldschmidt et al. | |
| 2008/0207374 A1* | 8/2008 | Iwanaka et al. | 475/5 |
| 2009/0093331 A1* | 4/2009 | Iwanaka et al. | 475/5 |
| 2009/0093332 A1* | 4/2009 | Bucknor et al. | 475/5 |
| 2009/0275439 A1* | 11/2009 | Kersting | 475/5 |
| 2011/0130234 A1* | 6/2011 | Phillips | 475/5 |
| 2011/0230291 A1* | 9/2011 | Phillips | 475/5 |
| 2011/0245003 A1* | 10/2011 | Takami | 475/5 |

OTHER PUBLICATIONS

International Search Report for International Application No. PCT/EP2011/004127, dated Nov. 28, 2011.

International Preliminary Report on Patentability for International Application No. PCT/EP2011/004127 including Written Opinion of the International Searching Authority and translation thereof, dated Feb. 26, 2013.

* cited by examiner

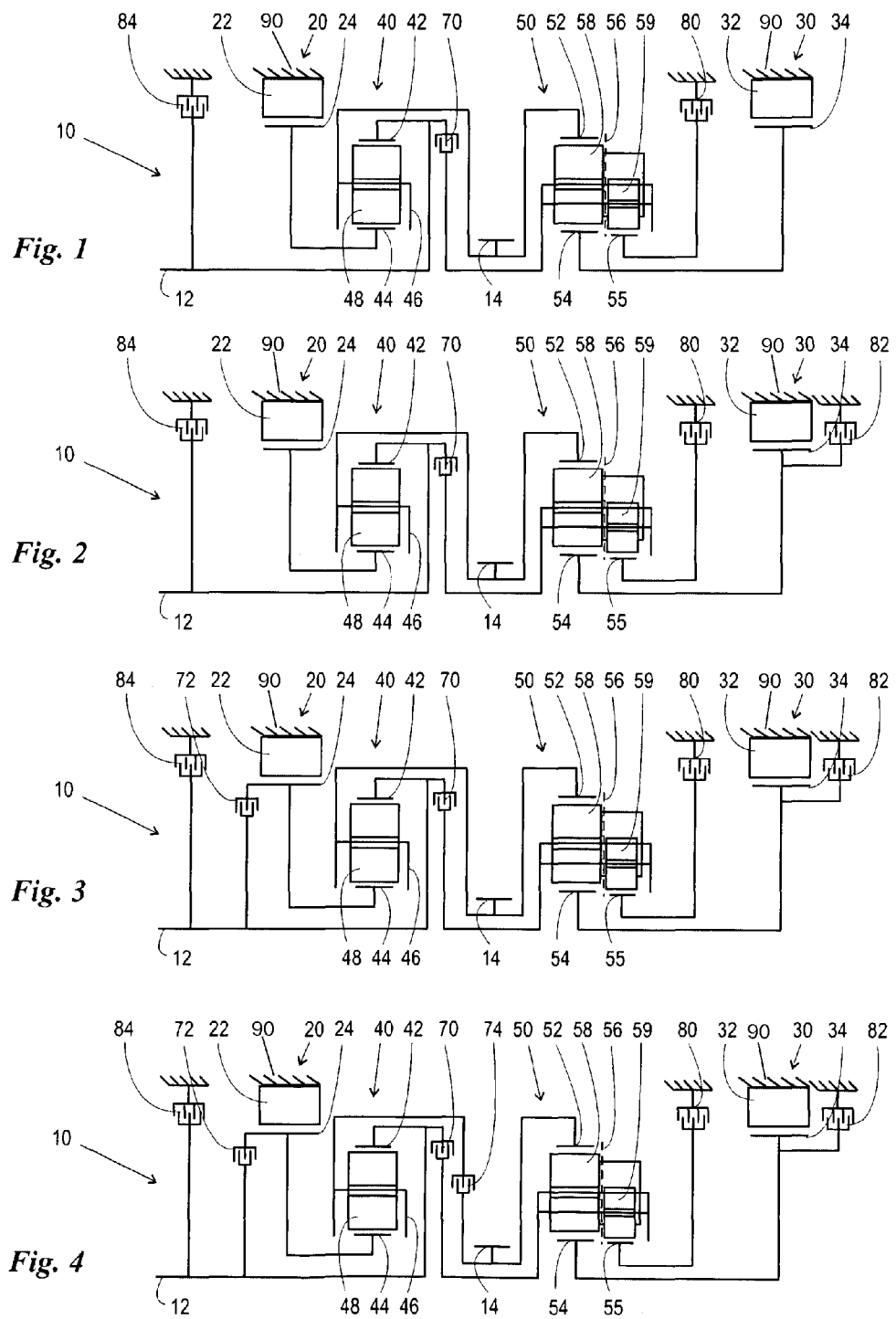

HYBRID DRIVE CONFIGURATION FOR A MOTOR VEHICLE

CROSS-REFERENCE TO RELATED APPLICATIONS

This application is a continuation, under 35 U.S.C. §120, of copending International Application No. PCT/EP2011/004127, filed Aug. 17, 2011, which designated the United States; this application also claims the priority, under 35 U.S.C. §119, of German Patent Application No. DE 10 2010 035 205.5, filed Aug. 24, 2010; the prior applications are herewith incorporated by reference in their entirety.

BACKGROUND OF THE INVENTION

Field of the Invention

The invention relates to a hybrid drive configuration for a motor vehicle, wherein the elements of the hybrid drive configuration are at least partly contained in a housing.

A variety of embodiments of hybrid drive configurations in the form of power-split transmissions are known to persons of skill in the art. Such drive configurations include a first electric machine, which is usually embodied as an inner rotor and which can be operated both in the motor operation mode and in the generator operation mode, and a second electric machine, which is typically also embodied as an inner rotor, and can be operated both, in the motor operation mode and in the generator operation mode. The electric machines are each coupled, via a planetary gear set having a ring gear, sun gear and a set of planet gears rotatably mounted on a carrier, with an input-side drive shaft and/or an output-side driven shaft. Further, the electric machines are connected, via power electronics, with each other as well as with an electric energy storage device, in particular a storage battery. A disadvantage of such hybrid drive configurations is the relatively large portion of reactive power in the mechanical branch, if the hybrid drive configuration operates in the power-split mode. Due to unavoidable friction losses, even the theoretically lossless portion of reactive power results in losses in a real case, which are undesirable in particular in view of a utilization of energy that is as efficient as possible.

SUMMARY OF THE INVENTION

It is accordingly an object of the invention to provide a hybrid drive configuration for a motor vehicle which overcomes the above-mentioned disadvantages of the heretofore-known configurations of this general type and which operates at least in some operating ranges without reactive power.

With the foregoing and other objects in view there is provided, in accordance with the invention, a hybrid drive configuration for a motor vehicle, including:
 a housing;
 an input-side drive shaft;
 an output-side driven shaft;
 a first electric machine with an outer stator fixed relative to the housing and an inner rotor;
 a second electric machine with an outer stator fixed relative to the housing and an inner rotor, the second electric machine being disposed axially adjacent to the first electric machine;
 a first planetary gear set including a ring gear, a sun gear, a carrier and a set of planet gears rotatably mounted on the carrier of the first planetary gear set, the set of planet gears meshing with the ring gear and the sun gear, the first planetary gear set coupling the first electric machine with the input-side drive shaft and the output-side driven shaft;
 a second planetary gear set embodied as a Ravigneaux gear set, the second planetary gear set including a ring gear, a first sun gear, a carrier, a set of long planet gears rotatably mounted on the carrier of the second planetary gear set and meshing with the ring gear and the first sun gear and including a second sun gear and a set of short planet gears rotatably mounted on the carrier of the second planetary gear set and meshing with the set of long planet gears and the second sun gear, the second planetary gear set coupling the first planetary gear set with the second electric machine;
 the input-side drive shaft, the output-side driven shaft, the first electric machine, the second electric machine; the first planetary gear set, and the second planetary gear set being at least partly contained in the housing;
 the carrier of the first planetary gear set being coupled with the ring gear of the second planetary gear set, the ring gear of the second planetary gear set being fixedly connected to the output-side driven shaft;
 a first clutch, the carrier of the second planetary gear set being connectable, by the first clutch, to the ring gear of the first planetary gear set, the ring gear of the first planetary gear set being fixedly connected to the input-side drive shaft;
 the rotor of the first electric machine being fixedly connected to the sun gear of the first planetary gear set;
 the rotor of the second electric machine being fixedly connected to the first sun gear of the second planetary gear set; and
 a first brake, the second sun gear of the second planetary gear set being connectable to the housing by the first brake.

In other words, according to the invention, there is provided a hybrid drive configuration for a motor vehicle, comprising a housing (90) and at least partly included therein:
 an input-side drive shaft (12),
 an output-side driven shaft (14),
 a first electric machine (20) with an outer stator (22) fixed relative to the housing (90) and an inner rotor (24),
 a second electric machine (30) with an outer stator (32) fixed relative to the housing (90) and an inner rotor (34), the second electric machine (30) disposed axially adjacent to the first electric machine (20),
 a first planetary gear set (40) including a ring gear (42), a sun gear (44), and a set of planet gears (48) rotatably mounted on a carrier (46), the set of planet gears (48) meshing with the ring gear (42) and the sun gear (44), wherein the first planetary gear set (40) couples the first electric machine (20) with the drive shaft (12) and the driven shaft (14), and
 a second planetary gear set (50) embodied as a Ravigneaux gear set and including a ring gear (52), a first sun gear (54), a set of long planet gears (58) rotatably mounted on a carrier (56) and meshing with the ring gear (52) and the first sun gear (54) and including a second sun gear (55) and a set of short planet gears (59) rotatably mounted on the carrier (56) and meshing with the set of long planet gears (58) and the second sun gear (55), wherein the second planetary gear set (50) couples the first planetary gear set with the second electric machine (30), and wherein
 the carrier (46) of the first planetary gear set (40) is coupled with the ring gear (52) of the second planetary gear set (50), the ring gear (52) of the second planetary gear set (50) being fixedly connected to the driven shaft (14),
 the carrier (56) of the second planetary gear set (50) is connectable, by a first clutch (70), to the ring gear (42) of the first planetary gear set (40), the ring gear of the first planetary gear set is fixedly connected to the drive shaft (12), the rotor (24) of the first electric machine (20) is fixedly connected to the sun gear (44) of the first planetary gear set (40), the rotor (34) of the second electric machine (30) is fixedly connected to the first sun gear (54) of the second planetary gear set (50), and the second sun gear of the second planetary gear set (50) is connectable to the housing (90) by a first brake.

Preferred embodiments of the invention are defined in the dependent claims.

According to another embodiment of the invention, there is provided a second brake, the rotor of the second electric machine being connectable to the housing by the second brake. In other words, the rotor (34) of the second electric machine (30) is connectable to the housing (90) by a second brake (82).

According to another embodiment of the invention, there is provided a second clutch, the rotor of the first electric machine being connectable to the input-side drive shaft by the second clutch. In other words, the rotor (24) of the first electric machine (20) is connectable to the drive shaft (12) by a second clutch (72).

According to another embodiment of the invention, there is provided a third clutch, the carrier of the first planetary gear set being connectable to the output-side driven shaft by the third clutch. In other words, the carrier (46) of the first planetary gear set (40) is connectable to the driven shaft (14) by a third clutch (74).

According to another embodiment of the invention, there is provided a third brake, the input-side drive shaft being connectable to the housing by the third brake. In other words, the drive shaft (12) is connectable to the housing by a third brake (84).

In the context of this description, the terms "coupling" and, respectively, "coupled" are understood in a broad manner and include in particular the fixed connection on the one hand and the controllable (shiftable, switchable) coupling and, respectively, connectability on the other hand.

The terms "fixed connection" and, respectively, "fixedly connected" mean in the context of the present description an operative connection between two elements that is in principle suitable for a transmission of moments and that is not separable (by means of control elements). This can in particular be a connection which is fixed against relative rotation and in which the connected elements always have a difference in rotational speed of zero. On the other hand, even elements which are permanently coupled to one another, i.e. not separable (by means of control elements), for example via a transmission ratio stage, are to be understood as "fixedly connected" in the context of the present description.

"Controllable connection" and, respectively, "controllably connected" or "connectable" designates in the context of the present description a coupling between two elements that can be transferred, by means of a control element, from a moment-transmitting, connected state to a separated state transmitting no moment, and vice versa.

An essential feature of the present invention is that one of the planetary gear sets, which are provided for coupling the two electric machines with the drive shaft and/or the driven shaft, is embodied as a Ravigneaux set. A Ravigneaux set, or, synonymously, a Ravigneaux gear set is understood by a person of skill in the art as a planetary gear set with a common ring gear, a common carrier or, synonymously, planet carrier, two sun gears of different sizes and a double planet set, wherein a set of long planets, preferably stepped planets, meshes with the ring gear and one of the sun gears, and a set of short planets meshes with the long planets, preferably with their smaller stage, and the other sun gear.

As is known from the prior art, the planetary gear set designated here as the first planetary gear set carries out the coupling of the first electric machine. As is also known from the prior art, the planetary gear set designated here as the second planetary gear set on the one hand carries out the coupling of the second electric machine. At the same time, the Ravigneaux set, which can be imagined functionally as two simple planetary gear sets, carries out a coupling between the first planetary gear set and the functional second gear set. In other words, a functional intermediate gear set is implemented, without requiring the installation of an additional actual planetary gear set. When compared to the functionally analogous construction with three simple planetary gear sets, this has the advantage of a smaller installation space and a reduction in the number of rotating parts.

In order to avoid reactive power, the Ravigneaux gear set is coupled in a particular manner. In particular, it is coupled symmetrically with the first planetary gear set by a crosswise coupling of the carrier and the ring gear of the one planetary gear set with the ring gear and, respectively, the carrier of the other planetary gear set. This results in a range within the power-split operating mode that is free of reactive power.

Here, the coupling of the carrier of the Ravigneaux gear set is controllably coupled, by means of a first clutch, with the ring gear of the first planetary gear set, while the carrier of the first planetary gear set is fixedly connected to the ring gear of the Ravigneaux gear set. Together with the further aspect of the invention, according to which the second sun gear of the second Ravigneaux gear set is connectable to the housing by means of a first brake, i.e., in accordance with the respective control state of the first brake, can rotate freely or be held fixed to the housing, this measure allows, apart from purely electric operating modes, the implementation of two power-split operating modes as well as a fixed mechanical gear.

Finally, it is provided that the two electric machines respectively act on the sun gear or on a sun gear of the planetary gear set assigned to them. In this way, the moments are minimized in a desirable way.

In an advantageous embodiment of the invention it is provided that the carrier of the first planetary gear set and the ring gear of the second planetary gear set, which according to the invention are fixedly connected to each other, are together connectable to the driven shaft by means of a first clutch. When the first clutch is closed the aforementioned power-split, reactive-power-free operating mode is available. An opening of the first clutch makes however further operating states available that depend on the specific embodiment of the gear set and the current control state of possible further control elements.

A further development of the invention may for example provide that the rotor of the second electric machine can be connected to the housing by means of a second brake. Thus also the first sun gear of the Ravigneaux gear set, which is fixedly connected to the rotor of the second electric machine, is held fixed at the housing so that, when the first clutch is closed, a long mechanical fixed gear is implemented.

Preferably a second clutch is provided by means of which the rotor of the first electric machine can be connected to the drive shaft. This also makes it possible, again in case of a closed first clutch but opened second brake, to implement a long (possibly additional) mechanical fixed gear.

In a further development of this embodiment, it is provided that the carrier of the first planetary gear set is connectable, by means of a third clutch, to the driven shaft. In all of the aforementioned operating modes this third clutch is closed.

By opening the third clutch, however, a series operating mode can be implemented. For this purpose, additionally the first brake and the second clutch are to be closed, with otherwise opened control elements, i.e. the second brake and the first clutch.

In all of the aforementioned embodiments, it may be provided that the drive shaft is connectable, by a third brake, to the housing. By means of this brake a torque that acts back on the drive shaft can be mechanically supported in the purely electric mode. A support or bracing of such a counteracting torque is necessary so that the combustion engine, which stops in the purely electric operation and which is connected outside the housing to the drive shaft, does not co-rotate in an idle manner or run backwards. Normally, i.e. according to the prior art, such a torque support does not take place, so that no moment can be applied to the sun gear of the first planetary gear set by the first electric machine in an electric driving mode. In the case of the preferably provided mechanical support against the housing, however, the first electric machine can be operated independently and can be used to propel the motor vehicle.

Other features which are considered as characteristic for the invention are set forth in the appended claims.

Although the invention is illustrated and described herein as embodied in a hybrid drive configuration for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic view illustrating a first embodiment of a hybrid drive configuration according to the invention;

FIG. 2 is a schematic view illustrating a second embodiment of a hybrid drive configuration according to the invention;

FIG. 3 is a schematic view illustrating a third embodiment of a hybrid drive configuration according to the invention; and FIG. 4 is a schematic view illustrating a fourth embodiment of a hybrid drive configuration according to the invention.

DETAILED DESCRIPTION OF THE INVENTION

Referring now to the figures of the drawings in detail, FIGS. 1 to 4 show different embodiments of a hybrid drive configuration 10 in accordance with the invention. Elements recurring in all figures will first be discussed together. Thereafter, the differences between the various embodiments will be explained. The same reference symbols in the figures indicate the same or analogous elements.

All shown hybrid drive configurations 10 have an input-side drive shaft 12 and an output-side driven shaft 14. Further, all shown hybrid drive configurations 10 include a first electric machine 20 and a second electric machine 30. The stator 22 of the first electric machine 20 is connected in a manner fixed against relative rotation to a housing 90. The rotor 24 of the first electric machine 20 is rotatably mounted in a radial manner within the stator 22. The stator 32 of the second electric machine 30 is also connected in a manner fixed against relative rotation to the housing 90. The rotor 34 of the second electric machine is rotatably mounted radially inside the stator 32. The two electric machines 20, 30 are disposed axially adjacent one another. This is referred to as a so-called "in-line" configuration.

Disposed between the two electric machines 20, 30 are two planetary gear sets, namely, the first planetary gear set 40 and the second planetary gear set 50, which is embodied as a Ravigneaux gear set. The first planetary gear set 40 has a ring gear 42, a sun gear 44 and a set of planet gears 48 rotatably mounted on a carrier 46. The second planetary gear set 50 has a common ring gear 52, a first sun gear 54, a second sun gear 55, a set of long planet gears 58 rotatably mounted on a carrier 56 and a set of short planet gears 59 likewise rotatably mounted on the carrier 56.

The rotor 24 of the first electric machine 20 is fixedly connected to the sun gear 44 of the first planetary gear set 40. The rotor 34 of the second electric machine 30 is fixedly connected to the first sun gear 54 of the second planetary gear set 50, which meshes with the long planet gears 58. The engagement of the electrical machines 20, 30 at the sun gears 44, 54 results in a minimization of the moments within the transmission configuration.

The second sun gear 55 of the second planetary gear set 50 meshing with the short planet gears 59 can be fixed to the housing through the use of the first brake 80.

In all embodiments of the invention, the ring gear 42 of the first planetary gear set 40 is coupled in a controllable manner (engageably/disengageably), via a first clutch 70, to the carrier 56 of the second planetary gear set 50 and is fixedly connected to the drive shaft 12. In all of the embodiments, the carrier 46 of the first planetary gear set 40 is coupled with the ring gear 52 of the second planetary gear set 50. The ring gear 52 of the second planetary gear set 50 is fixedly connected to the driven shaft 14 in all embodiments that are illustrated. This particular coupling of the first and second planetary gear sets 40, 50 achieves the desired absence of reactive power at least in some operating ranges of the hybrid drive configuration 10.

All of the illustrated embodiments further have in common a brake, which is designated here as the third brake 84 and which couples the drive shaft 12 in a controllable manner to the housing 90, i.e. which, in the closed brake state, can hold the drive shaft 12 fixed at the housing 90 and, in the open brake state, can release it for a rotational movement. A person of skill in the art will realize that it is the effect of the third brake 84, to support (brace) a torque applied by the first electric machine 20 in the pure electric operation of the motor vehicle, which torque is transmitted via the first and second planetary gear sets 40, 50 to the drive shaft 12. Without the third brake 84 this task would have to be assumed solely by the second electric machine 30. Due to the third brake 84, the first electric machine 20 itself can now make a drive contribution instead.

FIG. 1 shows an embodiment of the invention, wherein the coupling of the carrier 46 of the first planetary gear set 40 with the driven shaft 14 is embodied as a fixed connection. As for the rest, the embodiment of FIG. 1 has all of the above-mentioned elements common to all embodiments and has in particular the three control elements that have been mentioned, namely, the first clutch 70, the first brake 80 and the third brake 84. Depending on the control state, the following operating modes are the result:

In a first power-split operating mode, the first brake 80 is closed, i.e. the second sun gear 55 of the second planetary gear set 50 is held fixed at the housing. The remaining control elements are open. This results in a mechanical path from a combustion engine, which attaches to the drive shaft 12, via the first planetary gear set 40 to the driven shaft 14. The first electric machine 20, which is coupled via the sun gear 44 of the first planetary gear set 40, can in this case either be operated in a generator mode or can contribute torque to the drive in a motor mode. The second planetary gear set 50, whose second sun gear 55 is held fixed at the housing and whose carrier 56 can rotate freely because of the opened first clutch 70, acts as a pure transmission ratio stage between the second electric machine 30 and the driven shaft 14. The second electric machine 30 can be operated in this state either in the generator mode or, in the motor operation mode, can contribute to the output.

The case of the first clutch 70 being additionally closed, results in a mechanical fixed gear, which bridges the first planetary gear set 40, so that the moment of the combustion engine is routed via the first planetary gear set 40 and the second planetary gear set 50 to the driven shaft 14.

A second power-split operating mode can be implemented by having only the first clutch 70 closed and the remaining control elements opened. In this operating mode, the Ravigneaux gear set 50 acts due to the freely rotating set of short planet gears 59 as a simple planetary gear set, in which the power is split.

Finally two purely electric operating modes can be implemented. In both electric modes, the third brake 84 is closed. Of the remaining two control elements, i.e. of the first clutch 70 and the first brake 80, in each case one is closed and the other is opened. The two planetary gear sets 40, 50 respectively act as pure transmission ratio stages.

The embodiment of FIG. 2 differs from that of FIG. 1 by a second brake 82, through the use of which the rotor 34 of the second electric machine 30 can be held fixed at the housing. By holding the rotor 34 of the second electric machine 30 fixed, also the first sun gear 54 of the second planetary gear set 50, which is fixedly connected to the rotor 34, is held fixed at the housing. This makes it possible to implement an additional, long mechanical fixed gear, namely, by the second brake 82 and the first clutch 70 being closed and the remaining control elements being opened. The moment of the combustion engine is thus transmitted by bypassing the first planetary gear set 40 via the short planet gears 59 of the second planetary gear set 50 to the driven shaft 14.

The remaining operating modes are implemented, as described above in connection with the embodiment of FIG. 1, in each case with an open second brake 82.

FIG. 3 shows an embodiment which differs from that of FIG. 2 by a second clutch 72 with which the rotor 24 of the first electric machine 20 is connectable to the drive shaft 12. This makes it possible to implement an additional, long mechanical fixed gear, namely, by the first clutch 70 and the second clutch 72 being closed and the remaining control elements being opened.

The remaining operating modes are implemented, as described above in connection with FIGS. 1 and 2, wherein in each case the second clutch 72 is opened.

FIG. 4 finally shows an embodiment of the invention, which differs from the embodiment according to FIG. 3 by an additional third clutch 74, which replaces the fixed connection in the other embodiments between the carrier 46 of the first planetary gear set 40 and the driven shaft 14 by a controllable coupling. Through the use of this additional clutch 74 there is an additional, series operating mode in which the first clutch 70 and the second clutch 72 are closed and the remaining control elements, in particular also the additional, third clutch 73, are open. In this control state, the mechanical connection between the drive shaft 12 and the driven shaft 14 is completely interrupted. The moment of the internal combustion engine is fully utilized for the motor operation of the first electric machine 20. The generated electric power is transferred, via power electronics which are not shown in the figures but are present in all embodiments, to the second electric machine 30, which in turn drives the driven shaft 14 in a purely electric manner. The second planetary gear set 50 acts in this case as a pure transmission ratio stage, since the first brake 80 is closed.

All of the remaining operating modes operate, as described above in connection with FIGS. 1 to 3, wherein in each case the third clutch 74 is closed.

The embodiments shown in the figures and discussed in the detailed description are of course only illustrative exemplary embodiments of the present invention. A person of skill in the art is provided with a wide range of possible variations in view of the present disclosure. In particular, the specific embodiment of the control elements can be adapted to the respective case of application.

LIST OF REFERENCE NUMERALS

10 hybrid drive configuration
12 drive shaft
14 driven shaft
20 first electric machine
22 stator of 20
24 rotor of 20
30 second electric machine
32 stator of 30
34 rotor of 30
40 first planetary gear set
42 ring gear of 40
44 sun gear of 40
46 carrier of 40
48 planet gears of 40
50 second planetary gear set (Ravigneaux gear set)
52 ring gear of 50
54 first sun gear of 50
55 second sun gear of 50
56 carrier of 50
58 long planet gears of 50
59 short planet gears of 50
70 first clutch
72 second clutch
74 third clutch
80 first brake
82 second brake
84 third brake
90 housing

The invention claimed is:

1. A hybrid drive configuration for a motor vehicle, comprising:
a housing;
an input-side drive shaft;
an output-side driven shaft;
a first electric machine with an outer stator fixed relative to said housing and an inner rotor;
a second electric machine with an outer stator fixed relative to said housing and an inner rotor;
a first planetary gear set including a ring gear, a sun gear, a carrier and a set of planet gears rotatably mounted on said carrier of said first planetary gear set, said set of planet gears meshing with said ring gear and said sun gear, said first planetary gear set coupling said first electric machine with said input-side drive shaft and said output-side driven shaft;

a second planetary gear set embodied as a Ravigneaux gear set, said second planetary gear set including a ring gear, a first sun gear, a carrier, a set of long planet gears rotatably mounted on said carrier of said second planetary gear set and meshing with said ring gear and said first sun gear and including a second sun gear and a set of short planet gears rotatably mounted on said carrier of said second planetary gear set and meshing with said set of long planet gears and said second sun gear, said second planetary gear set coupling said first planetary gear set with said second electric machine;

said input-side drive shaft, said output-side driven shaft, said first electric machine, said second electric machine; said first planetary gear set, and said second planetary gear set being at least partly contained in said housing;

said carrier of said first planetary gear set being coupled with said ring gear of said second planetary gear set, said ring gear of said second planetary gear set being fixedly connected to said output-side driven shaft;

a first clutch, said carrier of said second planetary gear set being connectable, by said first clutch, to said ring gear of said first planetary gear set, said ring gear of said first planetary gear set being fixedly connected to said input-side drive shaft;

said rotor of said first electric machine being fixedly connected to said sun gear of said first planetary gear set;

said rotor of said second electric machine being fixedly connected to said first sun gear of said second planetary gear set; and a first brake, said second sun gear of said second planetary gear set being connectable to said housing by said first brake.

2. The hybrid drive configuration according to claim 1, including a second brake, said rotor of said second electric machine being connectable to said housing by said second brake.

3. The hybrid drive configuration according to claim 1, including a second clutch, said rotor of said first electric machine being connectable to said input-side drive shaft by said second clutch.

4. The hybrid drive configuration according to claim 3, including a third clutch, said carrier of said first planetary gear set being connectable to said output-side driven shaft by said third clutch.

5. The hybrid drive configuration according to claim 1, including a further brake, said input-side drive shaft being connectable to said housing by said further brake.

6. The hybrid drive configuration according to claim 2, including a third brake, said input-side drive shaft being connectable to said housing by said third brake.

* * * * *